United States Patent
Krizhevsky (10) Patent No.: US 10,540,587 B2
(45) Date of Patent: Jan. 21, 2020

(54) PARALLELIZING THE TRAINING OF CONVOLUTIONAL NEURAL NETWORKS

(71) Applicant: Google LLC, Mountain View, CA (US)

(72) Inventor: Alexander Krizhevsky, San Jose, CA (US)

(73) Assignee: Google LLC, Mountain View, CA (US)

(*) Notice: Subject to any disclaimer, the term of this patent is extended or adjusted under 35 U.S.C. 154(b) by 906 days.

(21) Appl. No.: 14/684,186

(22) Filed: Apr. 10, 2015

(65) Prior Publication Data
US 2015/0294219 A1 Oct. 15, 2015

Related U.S. Application Data

(60) Provisional application No. 61/978,734, filed on Apr. 11, 2014.

(51) Int. Cl.
*G06N 3/08* (2006.01)
*G06N 3/04* (2006.01)

(52) U.S. Cl.
CPC .................... *G06N 3/084* (2013.01)

(58) Field of Classification Search
None
See application file for complete search history.

(56) References Cited

U.S. PATENT DOCUMENTS

2014/0363074 A1* 12/2014 Dolfing .............. G06K 9/00979
382/156
2015/0100530 A1* 4/2015 Mnih .................. G06N 3/0454
706/25
2015/0294219 A1* 10/2015 Krizhevsky ........... G06N 3/084
706/25

FOREIGN PATENT DOCUMENTS

KR 1020080042083 A 11/2010

OTHER PUBLICATIONS

Yadan et al., "Multi-GPU Training of ConvNets," XP055226188, URL:http://arxiv.org/pdf/1312.5853v4.pdf, Feb. 18, 2014.*
Krizhevsky et al., "ImageNet classification with deep convolutional neural networks," in Advances in Neural Information Processing Systems 25 (NIPS 2012), 9 pp., 2012.*
Coates, et al., "Deep learning with cots hpc systems," In Proceedings of The 30th International Conference on Machine Learning, pp. 1337-1345, 2013.*
Dean, et al, "Large scale distributed deep networks," In NIPS, pp. 1232-1240, 2012.*
Deng, et al., "Imagenet: A large-scale hierarchical image database," In Computer Vision and Pattern Recognition, 2009. CVPR 2009. IEEE Conference on, pp. 248-255. IEEE, 2009.*

(Continued)

*Primary Examiner* — Alexey Shmatov
*Assistant Examiner* — Fuming Wu
(74) *Attorney, Agent, or Firm* — Fish & Richardson P.C.

(57) ABSTRACT

Methods, systems, and apparatus, including computer programs encoded on computer storage media, for training a convolutional neural network (CNN). The system includes a plurality of workers, wherein each worker is configured to maintain a respective replica of each of the convolutional layers of the CNN and a respective disjoint partition of each of the fully-connected layers of the CNN, wherein each replica of a convolutional layer includes all of the nodes in the convolutional layer, and wherein each disjoint partition of a fully-connected layer includes a portion of the nodes of the fully-connected layer.

18 Claims, 7 Drawing Sheets

(56) References Cited

OTHER PUBLICATIONS

Krizhevsky, et al., "Imagenet classification with deep convolutional neural networks," In NIPS, vol. 1, p. 4, 2012.*

Niu, et al., "Hogwild!: A lock-free approach to parallelizing stochastic gradient descent," Advances in Neural Information Processing Systems, 24:693-701, 2011.*

Paine, et al., "GPU asynchronous stochastic gradient descent to speed up neural network training," arXiv preprint arXiv:1312.6186, 2013.*

Yadan, et al., "Multi-GPU training of convnets," arXiv preprint arXiv:1312.5853, 2013.*

Yadan, O. et al. *Single Server Multi-GPU Training of ConvNets*. Retrieved on Mar. 13, 2014. Published Feb. 18, 2014. Retrieved from the internet: URL<http://arxiv.org/pdf/1312.5853.pdf>. 4 pages.

Krizhevsky, A. et al. *ImageNet Classification with Deep Convolutional Neural Networks*. Retrieved on Apr. 10, 2015. Proceedings of Neural Information Processing Systems 2012. Published Dec. 2012. Retrieved from the internet: URL<http://papers.nips.cc/paper/4824-imagenet-classification-with-deep-convolutional-neural-networks.pdf>. 9 pages.

Dean, J. et al. *Large Scale Distributed Deep Networks*. Retrieved on Apr. 10, 2015. Proceedings of Neural Information Processing Systems 2012. Published Dec. 2012. Retrieved from the internet: URL<http://static.googleusercontent.com/media/research.google.com/en/us/archive/large_deep_networks_nips2012.pdf>. 11 pages.

Krizhevsky, "One weird trick parallelizing convolutional neural Networks," arXiv:1404.5997v2 [cs.NE], Apr. 26, 2014, pp. 1-7.

Le, "Recent Developments in Deep Learning," STOC'13 Workshop on New (Theoretical) Challenges in Machine Learning, Jun. 1, 2013, 28 pages.

Yadan et al., "Multi-GPU Training of ConvNets," arXiv:1312.5853v4 [cs.LG], Feb. 18, 2014, pp. 1-4.

International Search Report and Written Opinion in International Application No. PCT/US2015/025451, dated Nov. 27, 2015, 17 pages.

EP Office Action in European Appln. 15719356.6, dated May 9, 2019, 8 pages.

KR Office Action issued in Korean Application No. 10-2016-7031625, dated Oct. 2, 2018, 3 pages (with English translation).

* cited by examiner

PARALLELIZING THE TRAINING OF CONVOLUTIONAL NEURAL NETWORKS

CROSS REFERENCE TO RELATED APPLICATIONS

This application is a non-provisional of and claims priority to U.S. Provisional Patent Application No. 61/978,734, filed on Apr. 11, 2014, the entire contents of which are hereby incorporated by reference.

BACKGROUND

This specification relates to parallelizing the training of convolutional neural networks.

Convolutional neural networks generally include two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

In general, this specification describes techniques for training a convolutional neural network (CNN) on multiple batches of training examples. The CNN is trained by multiple workers. Each worker is configured to maintain a respective replica of each of the convolutional layers of the CNN and a respective disjoint partition of each of the fully-connected layers of the CNN. Each replica of a convolutional layer includes all of the nodes in the convolutional layer and each disjoint partition of a fully-connected layer includes a portion of the nodes of the fully-connected layer. Each worker trains the convolutional layer replicas maintained by the worker on a batch of training examples assigned to the worker while training the fully-connected layer partition maintained by the worker on all of the multiple batches of training examples.

Particular embodiments of the subject matter described in this specification can be implemented so as to realize one or more of the following advantages. By parallelizing convolutional layers differently from fully-connected layers during the training of a convolutional neural network, the network can be trained efficiently and quickly by leveraging the different structure of the two types of layers. Additionally, by overlapping intermediate communications with training, e.g., by sending activation data from one worker to another in parallel with the workers processing data for other training examples, sending gradient data from one worker to another in parallel with the workers processing data for other training examples, or both, training time can be reduced and training delays due to transmission of data between workers training the convolutional neural network can be mitigated.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
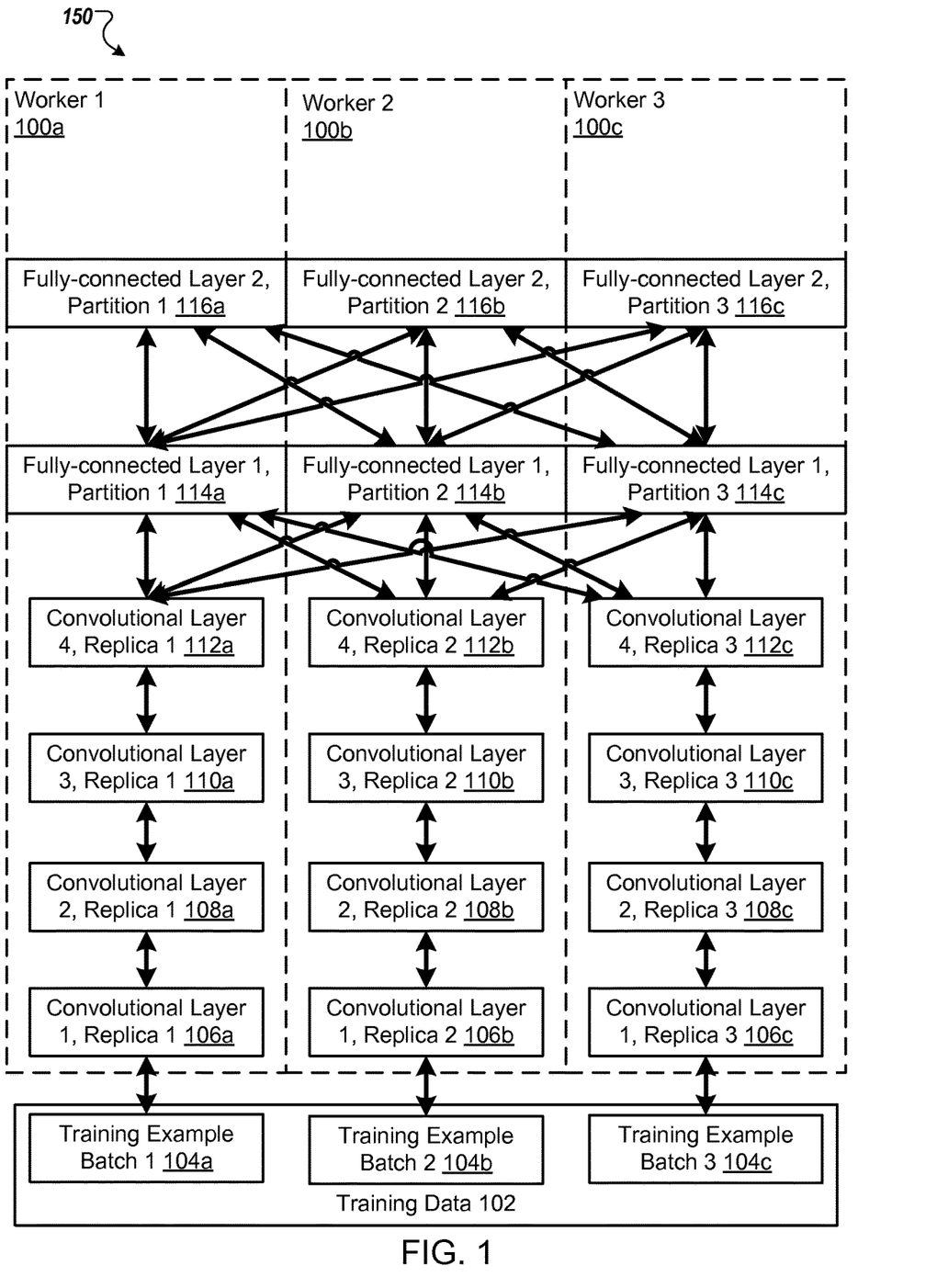
FIG. 1 is a block diagram of an example system for training a convolutional neural network (CNN).

FIG. 1 is a block diagram of an example system 150 for training a convolutional neural network (CNN). The CNN includes a sequence of neural network layers, with inputs to the CNN being received by the lowest layer in the sequence and processed through all of the layers in the sequence to generate an output from the input. For example, the input may be an image and the output may be a set of scores for each of a set of categories. The score generated for a given category represents a likelihood that the input image contains an image of an object that belongs to the category.

Each neural network layer in the CNN includes a set of nodes. Each node receives an input, i.e., from one or more nodes in a layer directly below the neural network layer in the sequence or, if the layer is the lowest layer in the sequence, all or a portion of the input to the CNN, and produces an activation from the input. The activations generated by the nodes in a given neural network layer are then provided as an input to nodes in the next highest layer in the sequence or, if the layer is the highest layer in the sequence, are treated as the output of the CNN.

In particular, the sequence of neural network layers includes a set of convolutional neural network layers followed by a set of fully-connected neural network layers. Generally, each node in a fully-connected layer receives an input from each node in the next lowest layer in the sequence and produces an activation from the received inputs in accordance with a set of weights for the node. The activations generated by each node in a given fully-connected layer are provided as an input to each node in the next highest fully-connected layer in the sequence or, if the fully-connected layer is the highest layer in the sequence, treated as the output of the CNN.

Unlike fully-connected layers, convolutional layers are generally sparsely-connected neural network layers. That is, each node in a convolutional layer receives an input from a portion of, i.e., less than all of, the nodes in the preceding neural network layer or, if the convolutional layer is the lowest layer in the sequence, a portion of an input to the CNN, and produces an activation from the input. Generally, convolutional layers have nodes that produce an activation by convolving received inputs in accordance with a set of weights for each node. In some cases, nodes in a convolutional layer may be configured to share weights. That is, a portion of the nodes in the layer may be constrained to always have the same weight values as the other nodes in the layer.

Some CNNs have layers of other types interspersed in the sequence of layers. For example, the other layers may include pooling layers, i.e., layers that include nodes that receive an input from a portion of the nodes in the next lowest layer in the sequence and produce an activation by pooling the received inputs, e.g., by computing either a maximum or a mean of the received inputs. As another example, the other layers may include scaling layers, i.e., layers that receive inputs from the next lowest layer in the sequence and apply a scalar function to each element in each received input. Because these other layers do not have weights that are modified during the training of the CNN, their presence or absence in the sequence does not affect the CNN training techniques described below. Therefore, the CNN described below will be described as not including these other types of layers for the sake of clarity of description. However, those of ordinary skill in the art will recognize that other types of layers may be included in the CNN without affecting the training process.

The system 150 includes multiple workers, i.e. worker 1 100a, worker 2 100b, and worker 3 100c. Each worker 100a-100c may be, e.g., a computer, a core within a computer having multiple cores, or other hardware or software within a computer capable of performing computations for training a partition or a replica of the CNN.

Each of the workers 100a-100c is configured to maintain a respective replica of each convolutional layer of the CNN. In the example of FIG. 1, each worker maintains replicas of four convolutional layers 106a-106c, 108a-108c, 110a-110c, and 112a-112c. Each replica of each convolutional layer is a separate instance of the convolutional layer, i.e., each replica includes all of the nodes of the convolutional layer.

Each of the workers 100a-100c is also configured to maintain a respective partition of each of the fully-connected layers of the CNN. In the example of FIG. 1, each worker maintains a respective partition 114a-114c of a first fully-connected layer of the CNN and a respective partition 116a-116c of a second fully-connected layer of the CNN. Each partition of a fully-connected layer includes a disjoint partition of the nodes of the fully-connected layer. Thus, collectively the partitions of a given fully-connected layer maintained by the workers 100a-100c make up a single instance of the fully-connected layer, i.e., while each partition includes only a portion of the nodes of a given layer, the partitions collectively include all of the nodes of the layer.

The workers 100a-100c train the CNN on training examples selected from training data 102. For example, the training examples may be images that have been classified as including images of objects from particular categories. The training data 102 includes multiple batches of training examples 104a-104c, with each batch including a predetermined number of training examples.

In order to train the CNN using the training examples, each worker 100a-100c is assigned a different batch of training examples and performs a neural network training technique to train the CNN on the training data. For example, the training technique may be a training technique that minimizes or maximizes an objective function for the CNN using stochastic gradient descent (SGD). Training a CNN on a batch of training data in a system with multiple workers is described in more detail below with reference to FIG. 3. Once each worker has performed the training technique on the worker's assigned batch, each worker can be assigned a new batch of training examples and can perform additional iterations of the training technique to train the CNN on the new batch, e.g., to continue to attempt to minimize or maximize the objective function.

Figure 2:
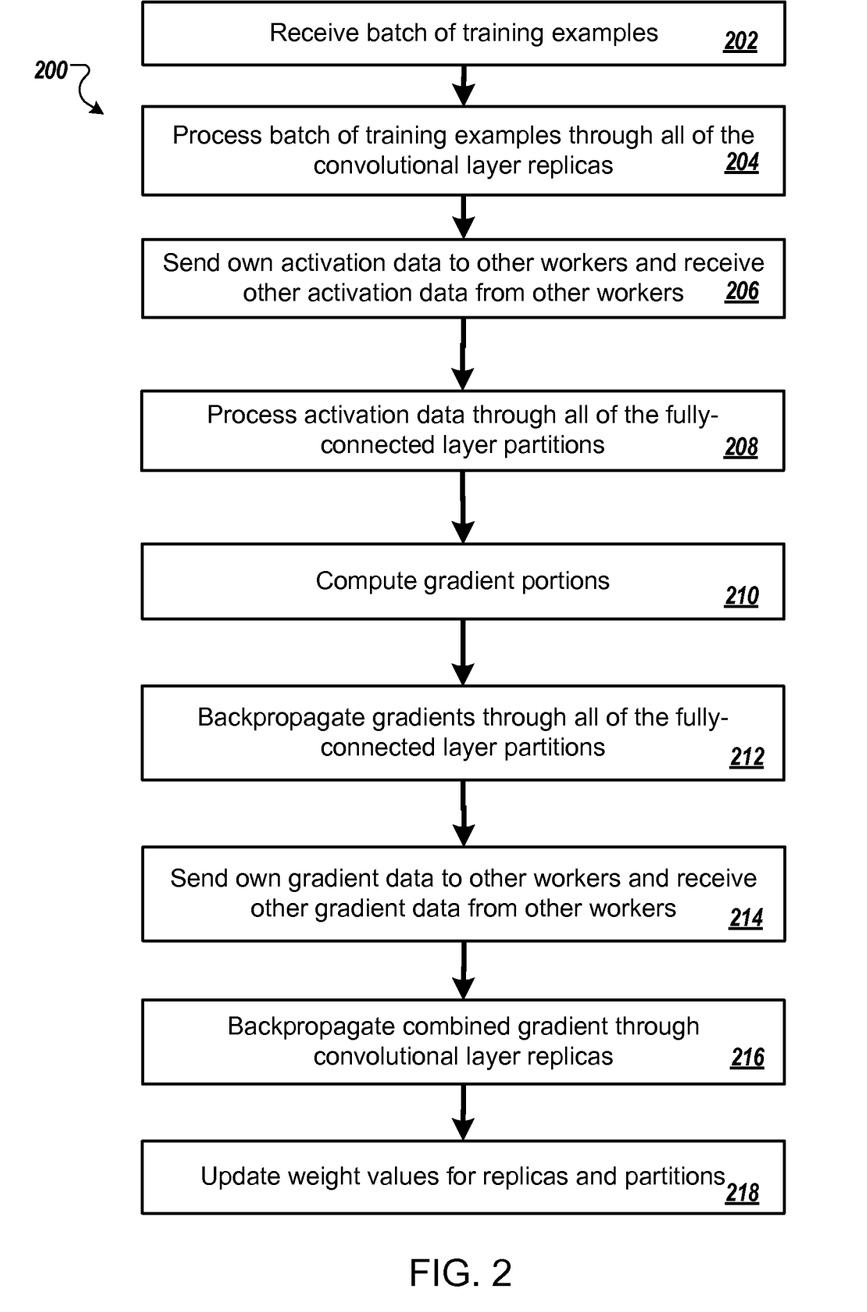
FIG. 2 is a flow diagram of an example process for training a CNN.

FIG. 2 is a flow diagram of an example process 200 for training a CNN. The process 200 can be performed by each of multiple workers, e.g., each of the workers 100a-100c of FIG. 1, appropriately programmed, as part of a technique for training the CNN. As described above, each worker is configured to maintain a respective replica of each of the convolutional layers of the CNN and a respective partition of each of the fully-connected layers of the CNN.

The worker receives a batch of training examples that has been assigned to the worker (step 202).

The worker processes each training example in the batch through all of the convolutional layer replicas maintained by the worker to compute respective convolutional activations for each training example in the batch (step 204). That is, the worker processes each training example through a lowest convolutional layer replica to generate initial convolutional activations for the training example, and then processes the lowest convolutional activation through each convolutional layer replica in sequence in order to compute the convolutional activations for the training example.

The worker sends own convolutional activation data to other workers that are training the CNN and receives other convolutional activation data from the other workers that are training the CNN (step 206). Generally, own convolutional activation data includes, for each own training example, i.e., for each training example in the batch assigned to the worker, the convolutional activations for the training example. Similarly, the other convolutional activation data for a given other training example, i.e., a training example assigned to one of the other workers training the CNN, includes the convolutional activations computed for the training example by the other worker. Example techniques for determining which convolutional activation data to send to the other workers and when the convolutional activation data is to be sent are described below with reference to FIGS. 5, 6, and 7.

The worker processes the convolutional activation data for the own training examples and the other training examples through all of the fully-connected layer partitions to compute a respective output partition for each own training example and each other training example (step 208). In particular, the output partition for a training example includes the activations of the highest fully-connected layer partition maintained by the worker for the training example. Processing convolutional activation data to compute an output partition is described in more detail below with reference to FIG. 3.

The worker obtains a respective gradient portion for each own training example and each other training example (step 210). In some implementations, each worker sends the output partitions computed by the worker to a designated one of the workers. That worker can then compute a gradient of an objective function and send the appropriate gradient portion to each of the workers. In some other implementations, each worker computes the respective gradient portion for each training example. For example, for each training example, the worker determines the error between the output portion computed by the worker and the corresponding portion of the known output for the training example, i.e., the activations that should have been computed by the nodes in the highest fully-connected layer partition maintained by the worker for the training example. The worker then computes the gradient of an objective function for the training example using the error. Because the worker only maintains a partition of the nodes of the highest fully-connected layer, the gradient computed by the worker is only a portion of the total gradient for the training example.

The worker backpropagates the gradient portions through all of the fully-connected layer partitions maintained by the worker and computes gradient portions for the highest convolutional layer replica that is maintained by the worker using the backpropagated gradients (step 212). Backpropagating a gradient portion through fully-connected layer partitions is described below with reference to FIG. 4.

The worker sends own gradient data, i.e., the gradient portions for the highest convolutional layer replica that is maintained by the worker, to other workers and receives other gradient data, i.e., the gradient portions for the partitions of the highest convolutional layer replica that are maintained by other workers, from the other workers (step 214). Example techniques for determining which gradient data to send to the other workers and when the gradient data is to be sent are described below with reference to FIGS. 5, 6, and 7. Generally, the worker sends the own gradient data for a given training example to the worker to which the training example was assigned. In order to do this, each worker keeps track of which data is associated with which training example and, therefore, which data must be sent to which worker. In some implementations, in order for the workers to determine which data being processed by a worker corresponds to which training example, each worker maintains data received from other workers in a fixed order that defines which data corresponds to which training example and which training examples are assigned to which other worker. In some other implementations, whenever a worker sends data for a training example to another worker, the worker can also send metadata that associates the data with the training example to the other worker.

Once received, the worker can combine the own gradient portion computed by the worker for each training example assigned to the worker with the other gradient portions for the training example computed by other workers to generate a respective full gradient for the highest convolutional layer replica for each training example in the batch of training examples that was assigned to the worker.

The worker backpropagates the full gradients through all of the remaining convolutional layer replicas maintained by the worker (step 216). That is, the worker calculates full gradients at each convolution layer replica and then backpropagates the full gradients to the next lowest convolutional layer replica for use in calculating the full gradients for that replica.

The worker updates weight values for the convolutional layer replicas and the fully-connected layer partitions maintained by the worker using the corresponding gradients for each replica and partition (step 218). In general, how the worker updates weight values depends on the training technique being used. For example, in some training techniques, the new value $w_n$ of a given weight computed using the gradient for a given training example may satisfy:

$$w_n w_0 - \alpha \Delta Q(w_0),$$

where $w_0$ is the current weight value of the weight, $\alpha$ is a constant value, and $\Delta Q(w_0)$ is the gradient for the weight for the training example.

Generally, because only one worker maintains each node in a given fully-connected layer, for each node in a fully-connected layer, each worker updates the weight values for the nodes maintained by the worker using the gradient portions computed by the worker.

However, because the values of the weights of the convolutional layers are maintained separately by each worker, the gradients for the convolutional layers must be synchronized before each worker updates the weights for their replica of the convolutional layer. In order to synchronize the gradients, each worker may be assigned a different portion of each convolutional layer for which to synchronize the weights. Each other worker can send the gradients for a given node to the worker to which the node has been assigned. The assignee worker can accumulate the gradient and then send the accumulated gradient to each other worker. Each worker can then update the weights for the nodes in convolutional layers using the same accumulated gradient as each other worker.

Optionally, rather than assigning each worker a different portion of each convolutional layer, each worker can send the gradients for each node of each convolutional layer replica to a central server. The central server can accumulate the gradients for each of the nodes that the server received from the workers and then send the accumulated gradients to each worker Once each worker has completed the process 200, each worker can be assigned a new batch of training examples and can repeat the process 200 for the new batch. The workers can continue to repeat the process 200, e.g., until convergence criteria for the training of the CNN have been satisfied or until a pre-determined number of iterations of the process have been performed.

Figure 3:
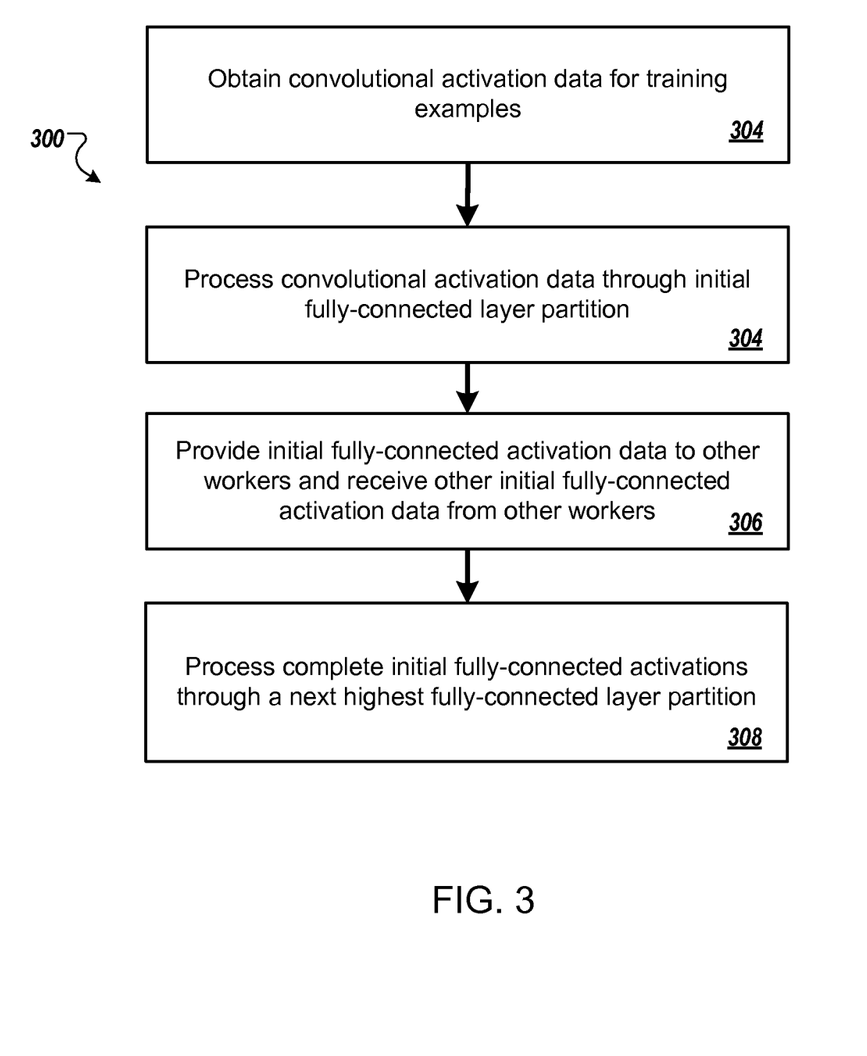
FIG. 3 is a flow diagram of an example process for processing activation data through fully-connected layer partitions maintained by a worker.

FIG. 3 is a flow diagram of an example process 300 for processing activation data through fully-connected layer partitions maintained by a worker. Then process 300 can be performed by each of multiple workers, e.g., each of the workers 100a-100c of FIG. 1, appropriately programmed, as part of a technique for training a CNN.

The worker obtains convolutional activation data for training examples (step 302).

The worker processes convolutional activation data through an initial fully-connected layer partition (step 304) to compute respective initial fully-connected layer portion activations for each training example identified in the activation data. In particular, the worker processes the convolutional activations for each example through the initial fully-connected layer partition in the activation data to generate respective initial fully-connected layer portion activations for each example. The initial fully-connected layer portion activations for each example include a respective activation generated by each node in the partition of the initial fully-connected layer maintained by the worker.

The worker provides own initial fully-connected layer activation data to other workers and receives other initial fully-connected activation data from the other workers (step 306). That is, the worker provides, for each training example, the initial fully-connected layer activations for the training example to each other worker. The worker also receives, from the other workers, initial fully-connected layer activations for each training example. Thus, after the worker receives the other activations, the worker has, for each of the training examples, complete initial fully-connected layer activations for each of the training examples. Similarly, the worker provides the own initial fully-connected layer activation data to each other worker to allow the other workers to possess complete initial fully-connected layer activations for each of the training examples.

The system processes the complete initial fully-connected layer activations for each training example through a next highest fully-connected layer partition maintained by the worker to generate respective subsequent fully-connected layer partition activations for each training example (step 308). The subsequent fully-connected layer portion activations for a given worker include a respective activation generated by each node in the partition of the next highest fully-connected layer maintained by the worker.

If the subsequent layer is the highest fully-connected layer in the CNN, the worker treats the subsequent fully-connected layer partition activations as the final fully-connected activations for the worker. If there are one or more layers higher in the sequence than the subsequent layer, the worker can repeat steps 304 and step 306 for each higher layer, i.e., by providing own current fully-connected layer partition activation data to other workers and receiving other current fully-connected layer partition activation data from the other workers to generate combined current fully-connected layer activations and then processing the combined activations using the next-highest layer in the sequence.

Figure 4:
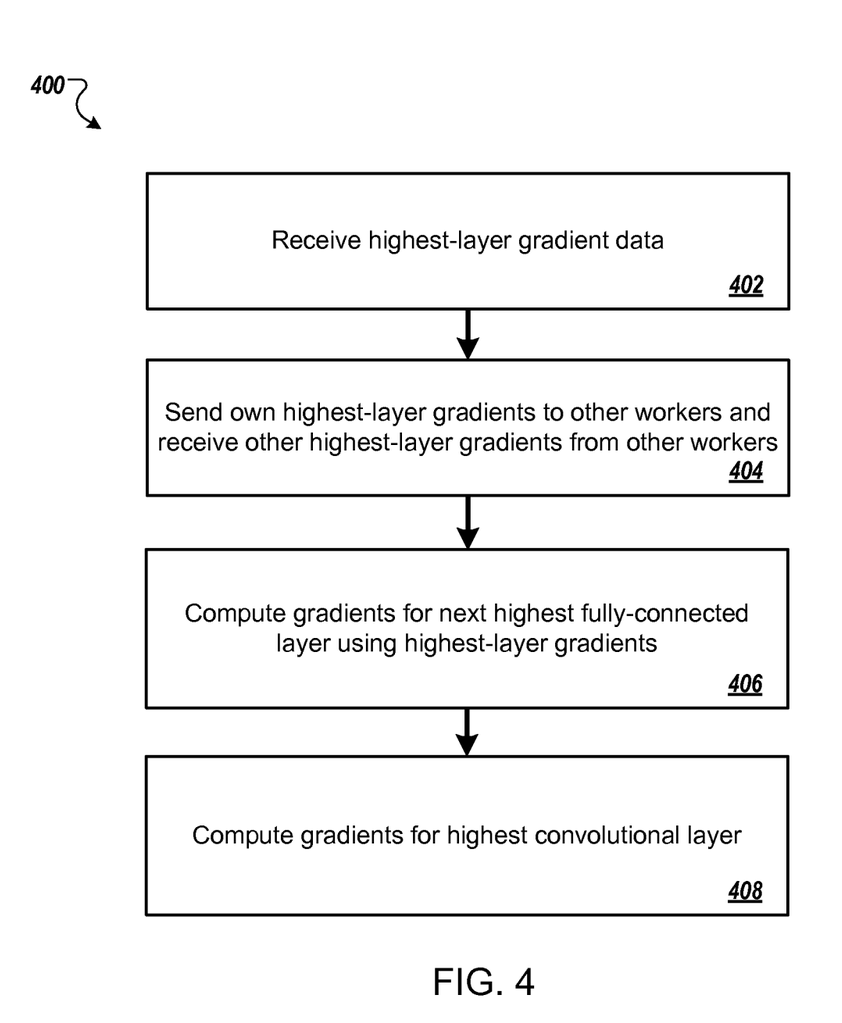
FIG. 4 is a flow diagram of an example process for backpropagating gradients through fully-connected layer partitions maintained by a worker.

FIG. 4 is a flow diagram of an example process 400 for backpropagating gradients through fully-connected layer partitions maintained by a worker. Then process 400 can be performed by each of multiple workers, e.g., each of the workers 100a-100c of FIG. 1, appropriately programmed, as part of a technique for training a CNN.

The worker receives highest-layer gradient data (step 402). The highest-layer gradient data includes respective gradients of an objective function for a highest fully-connected layer partition maintained by the worker for each of multiple training examples.

The worker sends own highest-layer gradient data, i.e., the highest-layer gradients for each training example, to other workers and receives other highest-layer gradients from other workers (step 404). For each training example, the worker can combine the other highest-layer gradients for the training example with the own highest-layer gradient for the training example to generate a combined highest-layer gradient for the training example.

The worker computes gradient portions for the fully-connected layer partition directly below the highest fully-connected layer partition using the combined highest-layer gradients for each training example (step 406). If the fully-connected layer partition directly below the highest fully-connected layer partition is the lowest partition in the sequence, the worker treats the gradients for the partition directly below the highest partition as the gradients for the lowest fully-connected layer partition in the sequence. If there are additional fully-connected layer partitions, the worker can repeat steps 404 and 406 for each lower fully-connected layer partition.

The worker computes a gradient portion for the highest convolutional layer for each training example using the lowest fully-connected layer partition gradients (step 408). That is, the worker computes the gradient portion for the highest convolutional layer using the values of the weights for the nodes of the lowest fully-connected layer partition maintained by the worker and data that has been backpropagated through the fully-connected layer partitions.

Figure 5:
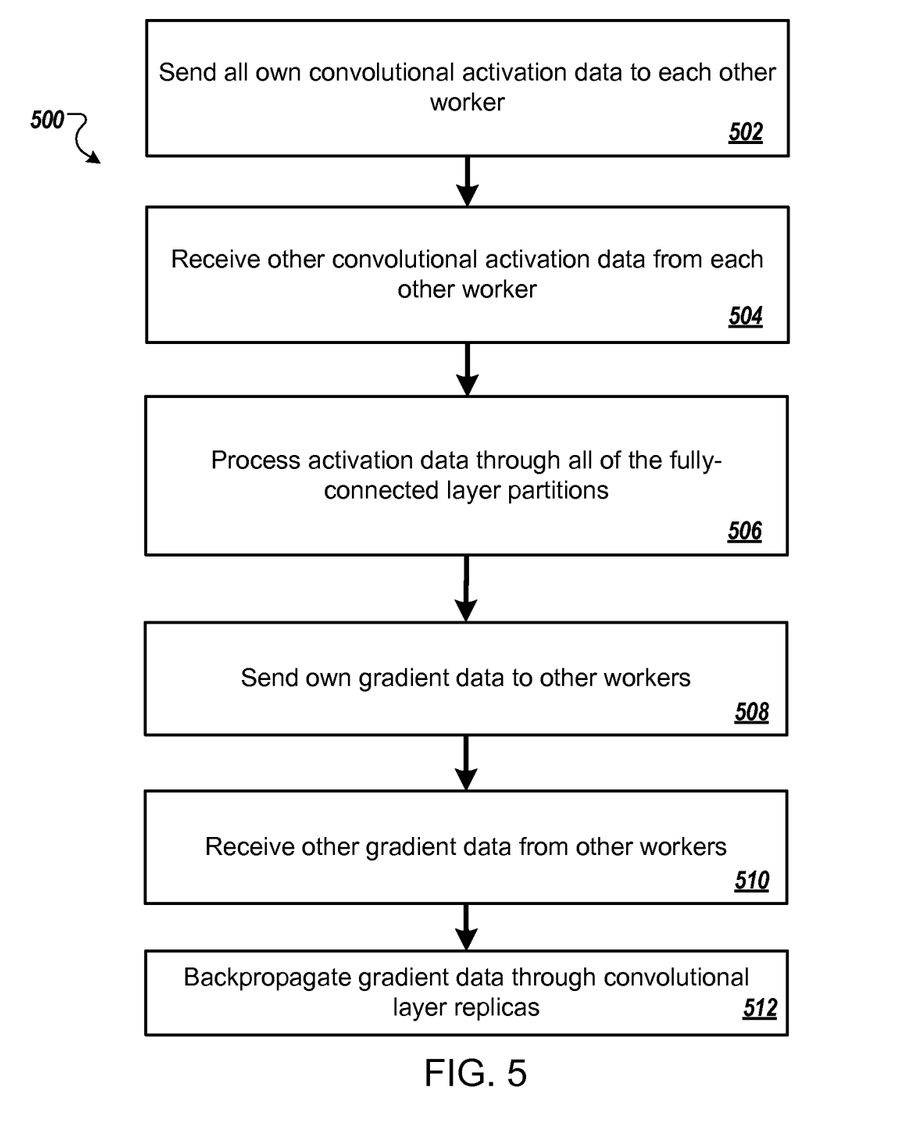
FIG. 5 is a flow diagram of an example process for communicating activation data and gradient data between workers.

FIG. 5 is a flow diagram of an example process 500 for communicating activation data and gradient data between workers. The process 500 can be performed by each of multiple workers, e.g., each of the workers 100a-100c of FIG. 1, appropriately programmed, as part of a technique for training a CNN.

The worker sends all own convolutional activation data, i.e., activations for each training example in the batch of training examples assigned to the worker, to each other worker that is training the CNN (step 502).

The worker receives other convolutional activation data from each other worker that is training the CNN (step 504). Once all of the convolutional activations have been received, the worker has convolutional activations for each training example that was assigned to any of the workers training the CNN during the current iteration of the training technique. The worker processes the own and other activation data through all of the fully-connected layer partitions to compute gradient data for each training example (step 506), e.g., as described above with reference to FIGS. 2, 3, and 4.

The worker sends own gradient data to other workers (step 508). That is, the worker identifies, for each highest-fully connected layer replica gradient portion computed by the worker, the corresponding training example and the worker from which the activation data for the training example was received. The worker then sends highest-fully connected layer replica gradient portion for each training example to the worker from which the activation data for the training example was received.

The worker receives other gradient data from other workers (step 510). That is, for each training example in the batch assigned to the worker, the worker receives highest-fully connected layer replica gradient portions for the training example from each other worker that is training the CNN. For each training example in the batch assigned to the worker, the system combines the own gradient data for the training example and the other gradient data for the training example to generate a combined gradient for the training example.

The worker backpropagates the combined gradient for training examples in the batch assigned to the worker through the remaining convolutional layer replicas maintained by the worker (step 512), e.g., as described above with reference to FIG. 2.

In some implementations, rather than each worker sending and receiving activation data for all of the training examples before beginning to process the activation data through the fully-connected layer partitions maintained by the worker, some of the operations may be parallelized. That is, the worker may begin processing activation data for some training examples while activation data for other training examples is being received by the worker.

Figure 6:
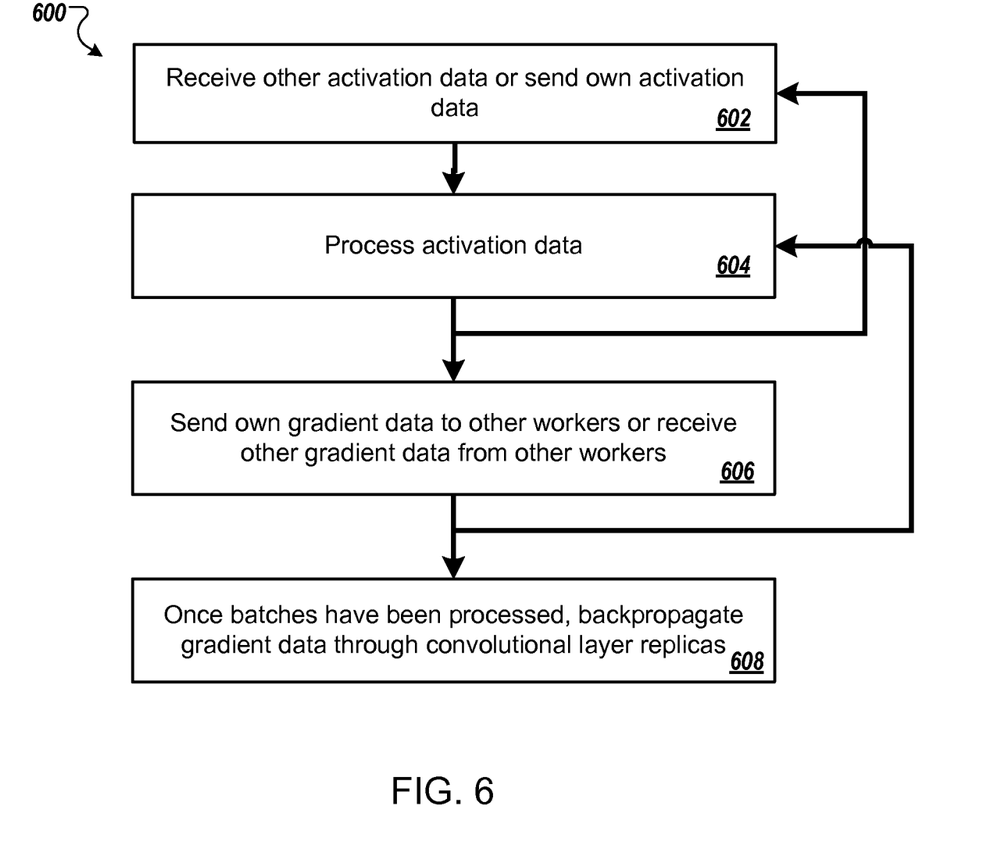
FIG. 6 is a flow diagram of another example process for communicating activation data and gradient data between workers.

FIG. 6 is a flow diagram of another example process 600 for communicating activation data and gradient data between workers. The process 600 can be performed by each of multiple workers, e.g., each of the workers 100a-100c of FIG. 1, appropriately programmed, as part of a technique for training a CNN.

The worker receives other convolutional activation data for a batch of training examples from another worker training the CNN or sends own convolutional activation data for the batch assigned to the worker to each other worker training the CNN (step 602). Each worker training the CNN is assigned a respective position in an ordering of the workers at which the worker is to send own convolutional data rather than receiving other convolutional data. If the current position in the ordering is the position assigned to the worker, the worker sends own data. If not, the worker receives other data. Once the current worker has sent own data to each other worker, the current position in the ordering increments to the next position.

The worker processes the convolutional activation data for the own batch or for the other batch through the fully-connected layer partitions maintained by the worker and computes highest-fully connected layer replica gradient portions for the batch (step 606), e.g., as described above with reference to FIGS. 2, 3, and 4.

In parallel with the worker processing the activation data for the batch, the worker receives other activation data from a different worker for the batch assigned to the worker or sends own activation data (step 602). That is, the worker again determines whether the current position in the ordering matches the position assigned to the worker and sends own data if the current position matches and receives own data if the current position does not match.

Once the worker has computed highest-fully connected layer replica gradient portions for the batch, the worker sends own gradient data to other workers or receives other gradient data from other workers (step 606).

In parallel with the sending or receiving gradient data, the worker processes the convolutional activation data that was sent or received in parallel with the worker processing the previous activation data to generate the gradient data (step 604).

Once all of the batches assigned to any of the workers have been processed by the worker and the worker has complete gradient data for each training example in the batch assigned to the worker, the worker backpropagates the complete gradient data through the remaining convolutional layer replicas maintained by the worker, e.g., as described above with reference to FIG. 2 (step 608).

Figure 7:
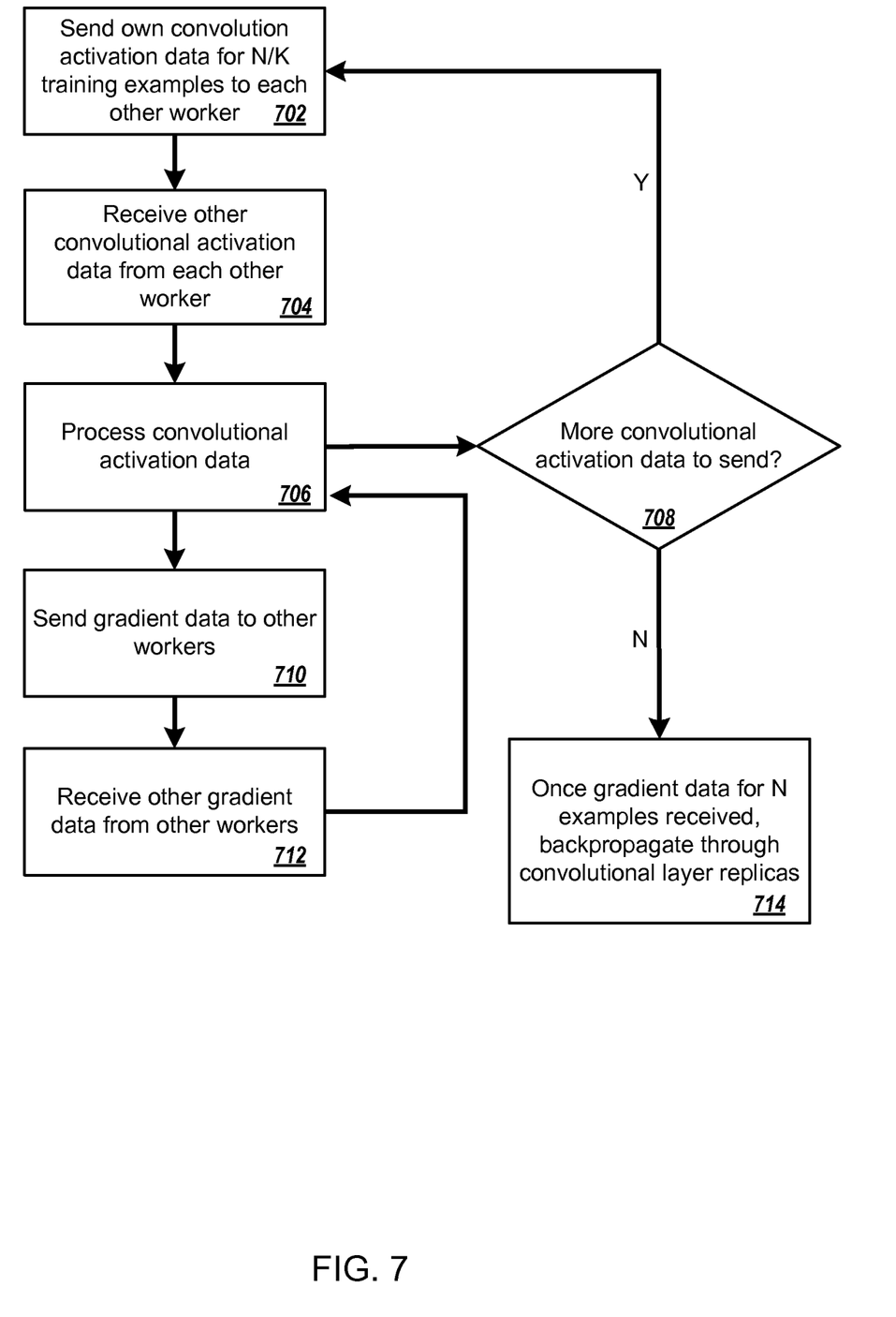
FIG. 7 is a flow diagram of another example process for communicating activation data and gradient data between workers.

FIG. 7 is a flow diagram of another example process 700 for communicating activation data and gradient data between workers. The process 700 can be performed by each of multiple workers, e.g., each of the workers 100a-100c of FIG. 1, appropriately programmed, as part of a technique for training a CNN.

The worker sends convolutional activation data for N/K training examples to each other worker, where N is the total number of training examples in the batch assigned to the worker and K is the total number of workers training the CNN (step 702).

The worker receives other convolutional activation data for N/K other training examples from each other worker (step 704). Thus, the worker receives convolutional activation data for (N)*(K−1)/K total training examples.

The worker processes the convolutional activation data for the N training examples, i.e., the (N)*(K−1)/K other training examples and the N/K own training examples, through the fully-connected layer partitions maintained by the worker and computes highest-fully connected layer replica gradient portions for each training example (step 706), e.g., as described above with reference to FIGS. 2, 3, and 4.

In parallel with the worker processing the convolutional activation data for the N training examples, the worker determines whether there is more convolutional activation data to be sent to other workers (step 708). In particular, the worker determines whether there are training examples in the batch assigned to the worker that have not yet been sent to the other workers training the CNN.

If there is more convolutional activation data to be sent to other workers, the worker, in parallel with processing the convolutional activation data for the current N training examples, sends convolution activation data for N/K more training examples to each other worker (step 702) and receives other convolutional data for N/K more training examples from each other worker (step 704).

Once the highest-fully connected layer replica gradient portions for the current N training examples have been computed, the worker sends gradient data for each of the N training examples to the worker to which the training example is assigned (step 710) and receives gradient data from the other workers for training examples assigned to the worker (step 712).

In parallel with sending and receiving the gradient data, the worker begins to process the convolutional activation data for the next N training examples (step 706) if the worker determined that there was more convolutional activation data to be sent at step 708.

If the worker determined that there was no more convolutional data to be sent at step 708, once the gradient data for all N training examples assigned to the worker is received, the worker backpropagates the gradient data through the remaining convolutional layer replicas maintained by the worker, e.g., as described above with reference to FIG. 2.

The above description generally describes that the workers wait to update the weights of the fully-connected layers until gradient data for all of the training examples assigned to the worker has been backpropagated through all of the convolutional layer replicas maintained by the worker. However, in some implementations, the worker can update the weights of the fully-connected layers at different intervals than the weights for the convolutional layers are updated. For example, in implementations where the process 700 is used to exchange data between convolutional layer replicas and fully-connected layer partitions, each worker can update the weights for the fully-connected layer partitions maintained by the worker after the gradients for each set of N training examples have been computed while waiting to update the weights for the convolutional layer replicas maintained by the worker until the gradients for all N training examples in the batch assigned to the worker have been backpropagated through all of the convolutional layer replicas. Similarly, in implementations where the process 600 is used to exchange data between convolutional layer replicas and fully-connected layer partitions, each worker can update the weights for the fully-connected layer partitions maintained by the worker after the gradients for the training examples currently being processed by the workers have been computed while waiting to update the weights for the convolutional layer replicas maintained by the worker until the gradients for all N training examples in the batch assigned to the worker have been backpropagated through all of the convolutional layer replicas.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for training an image processing convolutional neural network on a plurality of batches of training examples, wherein the image processing convolutional neural network is configured to receive as input one or more images and wherein each training example comprises one or more images, the image processing convolutional neural network having a plurality of layers arranged in a sequence from lowest to highest, the sequence including one or more convolutional layers followed by one or more fully-connected layers, each convolutional layer and each fully-connected layer comprising a respective plurality of nodes, the system comprising:
one or more computers configured to implement a plurality of workers, wherein each worker is configured to maintain a respective replica of each of the convolutional layers and a respective disjoint partition of each of the fully-connected layers, wherein each replica of a convolutional layer includes all of the nodes in the convolutional layer, wherein each disjoint partition of a fully-connected layer includes a portion of the nodes of the fully-connected layer, and wherein each worker is configured to perform operations comprising:
receiving a batch of training examples assigned to the worker, wherein the batches of training examples are assigned such that each worker receives a respective batch of the plurality of batches;
training the convolutional layer replica maintained by the worker on the batch of training examples assigned to the worker, comprising:
processing the batch of training examples through all of the convolutional layer replicas maintained by the worker to compute respective convolutional activations for each training example in the batch assigned to the worker; and
training the fully-connected layer partitions maintained by the worker on each of the plurality of batches of training examples, comprising:
sending own convolutional data to other workers in the plurality of workers, the own convolutional data comprising the respective convolutional activations for training examples assigned to the worker,
receiving other convolutional data from other workers in the plurality of workers, the other convolutional data comprising respective convolutional activations for other training examples assigned to other workers, and
in parallel with receiving the other convolutional data, processing the own convolutional data through a partition of a lowest fully-connected layer maintained by the worker to generate own initial fully-connected layer partition activations for the corresponding training examples.

2. The system of claim 1, wherein training the convolutional layer replica maintained by the worker on the batch of training examples assigned to the worker comprises:

obtaining gradient data for a highest fully-connected layer replica maintained by the worker for each of the training examples in the batch assigned to the worker; and
backpropagating the highest-fully connected layer replica gradient data through the remaining convolutional layer replicas maintained by the worker.

3. The system of claim 2, wherein training the fully-connected layer partitions maintained by the worker on each of the plurality of batches of training examples comprises:
obtaining respective convolutional data for each of the training examples in all of the plurality of batches, the obtained convolutional data comprising the own convolutional data and the received other convolutional data;
processing the convolutional data through a partition of a lowest fully-connected layer maintained by the worker to generate own initial fully-connected layer partition activations for the corresponding training examples;
sending the own initial fully-connected layer partition activations to other workers in the plurality of workers;
receiving other initial fully-connected layer partition activations from other workers in the plurality of workers;
for each other fully-connected layer partition maintained by the worker:
processing own partition activation data and other partition activation data for a next lowest fully-connected layer partition maintained by the worker through the fully-connected layer partition to generate own partition activation data for the fully-connected layer partition,
sending the own partition activation data for the fully-connected layer partition to other workers in the plurality of workers, and
receiving other partition activation data for the fully-connected layer partition from other workers in the plurality of workers;
receiving own highest fully-connected layer partition gradient data for each of the training examples;
sending the own highest fully-connected layer partition gradient data to other workers in the plurality of workers;
receiving other highest fully-connected layer partition gradient data from other workers in the plurality of workers; and
for each other fully-connected layer partition maintained by the worker:
backpropagating own partition gradient data and other partition gradient data for a next highest fully-connected layer partition maintained by the worker through the fully-connected layer portion to generate own gradient partition data for the fully-connected layer partition,
sending the own partition gradient data for the fully-connected layer partition to other workers in the plurality of workers, and
receiving other partition gradient data for the fully-connected layer partition from other workers in the plurality of workers.

4. The system of claim 3, wherein obtaining gradient data for a highest fully-connected layer replica maintained by the worker for each of the training examples in the batch assigned to the worker comprises:
computing own gradient data for a portion of the highest convolutional layer replica maintained by the worker for each training example;

sending own highest-fully connected layer replica gradient portion data to other workers in the plurality of workers; and receiving other highest-fully connected layer replica gradient portion from other workers in the plurality of workers.

5. The system of claim 3, wherein sending own convolutional data to other workers comprises sending own convolutional data for each training example in the batch assigned to the worker to each other worker in the plurality of workers, and wherein receiving other convolutional data comprises receiving other convolutional data for each other training example in each other batch in the plurality of batches.

6. The system of claim 5, wherein sending own highest-fully connected layer replica gradient portion data to other workers comprises sending own highest-fully connected layer replica gradient portion data for other training example in each other batch in the plurality of batches to the worker to which the training example is assigned, and wherein receiving other highest-fully connected layer replica gradient portion data from other workers in the plurality of workers comprises receiving, from each other worker, other highest-fully connected layer replica gradient portion data for each training example in the batch assigned to the worker.

7. The system of claim 3, wherein sending own convolutional data to other workers comprises sending own convolutional data for each training example in the batch assigned to the worker to each other worker in the plurality of workers, and wherein receiving other convolutional data comprises receiving other convolutional data for each other training example in a batch assigned to a particular other worker in parallel with processing the own convolutional data.

8. The system of claim 7, wherein receiving other highest-fully connected layer replica gradient portion data from other workers in the plurality of workers comprises receiving, from each other worker, other highest-fully connected layer replica gradient portion data for each training example in the batch assigned to the worker, and wherein processing the other convolutional data comprises processing the other convolutional data comprises processing the other convolutional data for each other training example in the batch assigned to the particular other worker in parallel with receiving the other highest-fully connected layer replica gradient portion data.

9. The system of claim 3, wherein sending own convolutional data to other workers comprises sending own convolutional data for a pre-determined number of training examples in the batch assigned to the worker to each other worker in the plurality of workers, and wherein receiving other convolutional data comprises receiving other convolutional data for the pre-determined number of training examples in each other batch in the plurality of batches.

10. The system of claim 9, wherein processing the own convolutional data and the other convolutional data comprises processing the own convolutional data and the other convolutional data in parallel with sending own convolutional data for another pre-determined number of training examples in the batch assigned to the worker and receiving other convolutional data for another pre-determined number of training examples in each other batch in the plurality of batches.

11. The system of claim 10, wherein sending own highest-fully connected layer replica gradient portion data to other workers comprises sending own highest-fully connected layer replica gradient portion data for the pre-determined number of other training examples in each other batch in the plurality of batches to the worker to which the training example is assigned, wherein receiving other highest-fully connected layer replica gradient portion data from other workers in the plurality of workers comprises receiving, from each other worker, other highest-fully connected layer replica gradient portion data for the pre-determined number of training examples, and wherein processing the own convolutional data and the other convolutional data comprises processing the own convolutional data and the other convolutional data for the other pre-determined number of training examples in parallel with sending the own highest-fully connected layer replica gradient portion data for the pre-determined number and receiving the other highest-fully connected layer replica gradient portion data for the pre-determined number.

12. The system of claim 3, the operations further comprising:

updating weights of the convolutional layer replicas and the fully-connected layer partitions using the corresponding gradient data.

13. A method for training an image processing convolutional neural network on a plurality of batches of training examples, wherein the image processing convolutional neural network is configured to receive as input one or more images and wherein each of the training examples comprises one or more images, the image processing convolutional neural network having a plurality of layers arranged in a sequence from lowest to highest, the sequence including one or more convolutional layers followed by one or more fully-connected layers, each convolutional layer and each fully-connected layer comprising a respective plurality of nodes, the method comprising:

maintaining, by each of a plurality of workers that are implemented by one or more computers, a respective replica of each of the convolutional layers, wherein each replica of a convolutional layer includes all of the nodes in the convolutional layer;

maintaining, by each of the workers, a respective disjoint partition of each of the fully-connected layers, wherein each disjoint partition of a fully-connected layer includes a portion of the nodes of the fully-connected layer;

receiving, by each of the workers, a batch of training examples assigned to the worker, wherein the batches of training examples are assigned such that each worker receives a respective batch of the plurality of batches;

training the convolutional layer replica maintained by the worker on the batch of training examples assigned to the worker, comprising:

processing the batch of training examples through all of the convolutional layer replicas maintained by the worker to compute respective convolutional activations for each training example in the batch assigned to the worker; and training the fully-connected layer partitions maintained by the worker on each of the plurality of batches of training examples, comprising:

sending own convolutional data to other workers in the plurality of workers, the own convolutional data comprising the respective convolutional activations for training examples assigned to the worker, receiving other convolutional data from other workers in the plurality of workers, the other convolutional data comprising respective convolutional activations for other training examples assigned to other workers, and in parallel with receiving the other convolutional data, processing the own convolutional data through a partition of a lowest fully-connected layer maintained by the worker to generate own initial fully-connected layer partition activations for the corresponding training examples.

14. The method of claim 13, wherein training the convolutional layer replica maintained by the worker on the batch of training examples assigned to the worker comprises:

obtaining gradient data for a highest fully-connected layer replica maintained by the worker for each of the training examples in the batch assigned to the worker; and backpropagating the highest-fully connected layer replica gradient data through the remaining convolutional layer replicas maintained by the worker.

15. The method of claim 14, wherein training the fully-connected layer partitions maintained by the worker on each of the plurality of batches of training examples comprises:

obtaining respective convolutional data for each of the training examples in all of the plurality of batches, the obtained convolutional data comprising the own convolutional data and the received other convolutional data;

processing the convolutional data through a partition of a lowest fully-connected layer maintained by the worker to generate own initial fully-connected layer partition activations for the corresponding training examples;

sending the own initial fully-connected layer partition activations to other workers in the plurality of workers;

receiving other initial fully-connected layer partition activations from other workers in the plurality of workers;

for each other fully-connected layer partition maintained by the worker:

processing own partition activation data and other partition activation data for a next lowest fully-connected layer partition maintained by the worker through the fully-connected layer partition to generate own partition activation data for the fully-connected layer partition, sending the own partition activation data for the fully-connected layer partition to other workers in the plurality of workers, and receiving other partition activation data for the fully-connected layer partition from other workers in the plurality of workers;

receiving own highest fully-connected layer partition gradient data for each of the training examples;

sending the own highest fully-connected layer partition gradient data to other workers in the plurality of workers;

receiving other highest fully-connected layer partition gradient data from other workers in the plurality of workers; and for each other fully-connected layer partition maintained by the worker:

backpropagating own partition gradient data and other partition gradient data for a next highest fully-connected layer partition maintained by the worker through the fully-connected layer portion to generate own gradient partition data for the fully-connected layer partition, sending the own partition gradient data for the fully-connected layer partition to other workers in the plurality of workers, and receiving other partition gradient data for the fully-connected layer partition from other workers in the plurality of workers.

16. The method of claim 15, wherein obtaining gradient data for a highest fully-connected layer replica maintained by the worker for each of the training examples in the batch assigned to the worker comprises:

computing own gradient data for a portion of the highest convolutional layer replica maintained by the worker for each training example;

sending own highest-fully connected layer replica gradient portion data to other workers in the plurality of workers; and receiving other highest-fully connected layer replica gradient portion from other workers in the plurality of workers.

17. The method of claim 15, further comprising:

updating, by each of the workers, weights of the convolutional layer replicas maintained by the worker and the fully-connected layer partitions maintained by the worker using the corresponding gradient data.

18. One or more non-transitory computer storage media encoded with instructions that, when executed by one or more computers, cause the one or more computers to perform operations for training an image processing convolutional neural network on a plurality of batches of training examples, wherein the image processing convolutional neural network is configured to receive as input one or more images and wherein each training example comprises one or more images, the image processing convolutional neural network having a plurality of layers arranged in a sequence from lowest to highest, the sequence including one or more convolutional layers followed by one or more fully-connected layers, each convolutional layer and each fully-connected layer comprising a respective plurality of nodes, the operations comprising:

maintaining, by each of a plurality of workers that are implemented by one or more computers, a respective replica of each of the convolutional layers, wherein each replica of a convolutional layer includes all of the nodes in the convolutional layer;

maintaining, by each of the workers, a respective disjoint partition of each of the fully-connected layers, wherein each disjoint partition of a fully-connected layer includes a portion of the nodes of the fully-connected layer;

receiving, by each of the workers, a batch of training examples assigned to the worker, wherein the batches of training examples are assigned such that each worker receives a respective batch of the plurality of batches;

training the convolutional layer replica maintained by the worker on the batch of training examples assigned to the worker, comprising:

processing the batch of training examples through all of the convolutional layer replicas maintained by the worker to compute respective convolutional activations for each training example in the batch assigned to the worker; and training the fully-connected layer partitions maintained by the worker on each of the plurality of batches of training examples, comprising:

sending own convolutional data to other workers in the plurality of workers, the own convolutional data comprising the respective convolutional activations for training examples assigned to the worker, receiving other convolutional data from other workers in the plurality of workers, the other convolutional data comprising respective convolutional activations for other training examples assigned to other workers, and in parallel with receiving the other convolutional data, processing the own convolutional data through a partition of a lowest fully-connected layer maintained by the worker to generate own initial fully-connected layer partition activations for the corresponding training examples.

\* \* \* \* \*

UNITED STATES PATENT AND TRADEMARK OFFICE
CERTIFICATE OF CORRECTION

PATENT NO. : 10,540,587 B2
APPLICATION NO. : 14/684186
DATED : January 21, 2020
INVENTOR(S) : Krizhevsky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this
Thirteenth Day of December, 2022

Katherine Kelly Vidal
*Director of the United States Patent and Trademark Office*